(12) United States Patent
Rahman et al.

(10) Patent No.: US 11,518,891 B2
(45) Date of Patent: Dec. 6, 2022

(54) METHOD OF USING WATER ERODIBLE MARINE ANTIFOULING COATING

(71) Applicant: King Fahd University of Petroleum and Minerals, Dhahran (SA)

(72) Inventors: Mohammad Mizanur Rahman, Dhahran (SA); Md. Hasan Zahir, Dhahran (SA); Mohammad Abu Jafar Mazumder, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 444 days.

(21) Appl. No.: 16/809,152

(22) Filed: Mar. 4, 2020

(65) Prior Publication Data

US 2021/0277259 A1 Sep. 9, 2021

(51) Int. Cl.
| | |
|---|---|
| *C09D 5/16* | (2006.01) |
| *C09D 175/04* | (2006.01) |
| *C08J 7/12* | (2006.01) |
| *B05D 1/28* | (2006.01) |
| *B05D 1/00* | (2006.01) |
| *B05D 1/04* | (2006.01) |

(Continued)

(52) U.S. Cl.
CPC ........... *C09D 5/1662* (2013.01); *B05D 1/005* (2013.01); *B05D 1/007* (2013.01); *B05D 1/02* (2013.01); *B05D 1/04* (2013.01); *B05D 1/18* (2013.01); *B05D 1/28* (2013.01); *C08J 7/0427* (2020.01); *C08J 7/12* (2013.01); *C09D 175/04* (2013.01); *C08J 2405/00* (2013.01); *C08J 2475/04* (2013.01); *C08K 5/0041* (2013.01); *C08K 5/56* (2013.01); *C08L 5/02* (2013.01); *C08L 5/14* (2013.01)

(58) Field of Classification Search
CPC .... C09D 5/1662; C09D 175/04; C08J 7/0427; C08J 7/12; C08J 2405/00; C08J 2475/04; B05D 1/005; B05D 1/007; B05D 1/02; B05D 1/04; B05D 1/18; B05D 1/28; C08K 5/0041; C08K 5/56; C08K 5/02; C08L 5/02; C08L 5/14
See application file for complete search history.

(56) References Cited

U.S. PATENT DOCUMENTS

| | | | |
|---|---|---|---|
| 7,335,248 B2 | 2/2008 | Abou-Nemeh | |
| 9,290,669 B2 * | 3/2016 | Dunford | .................. C09D 5/14 |
| (Continued) | | | |

FOREIGN PATENT DOCUMENTS

| | | |
|---|---|---|
| CN | 106999368 A | 8/2017 |
| WO | 2011/034931 A2 | 3/2011 |

OTHER PUBLICATIONS

Hamcerencu et al. "New unsaturated derivatives of Xanthan gum: Synthesis and characterization" Polymer vol. 48, Issue 7, 1921-1929. (Year: 2007).*

(Continued)

*Primary Examiner* — Robert S Walters, Jr.
(74) *Attorney, Agent, or Firm* — Oblon, McClelland, Maier & Neustadt, L.L.P.

(57) ABSTRACT

A method is described for inhibiting marine fouling on a surface. The surface is contacted with a composition comprising a waterborne polyurethane that is crosslinked with an acrylic acid functionalized polysaccharide, water, and a preservative. The composition is then dried to form a deposited film. The polysaccharide may be xanthan.

18 Claims, 8 Drawing Sheets

(51) Int. Cl.
*B05D 1/18* (2006.01)
*B05D 1/02* (2006.01)
*C08J 7/04* (2020.01)
*C08K 5/00* (2006.01)
*C08L 5/14* (2006.01)
*C08K 5/56* (2006.01)
*C08L 5/02* (2006.01)

(56) References Cited

U.S. PATENT DOCUMENTS

2004/0175407 A1 9/2004 McDaniel
2009/0081137 A1 3/2009 Nguyen Kim et al.

OTHER PUBLICATIONS

Rahman et al. "Water-Erodible Xanthan-Acrylate-Polyurethane Antifouling Coating" Polymers 2019, 11, 1700 (Year: 2019).*

Xu, et al. ; Preparation, mechanical properties of waterborne polyurethane and crosslinked polyurethane-acrylate composite; Journal of Applied Polymer Science, vol. 124, Issue 2 ; Oct. 11, 2011 ; Abstract Only ; 1 Page.

Callow, et al. ; Trends in the development of environmentally friendly fouling-resistant marine coatings ; Nature Communications 2, Article No. 244 ; Mar. 22, 2011 ; 35 Pages.

Xu, et al. ; Marine Biofouling Resistance of Polyurethane with Biodegradation and Hydrolyzation ; ACS Applied Materials & Interfaces ; American Chemical Society ; 8 Pages.

Brzeska ; Biodegradable Polyurethanes Cross-Linked by Multifunctional Compounds ; Current Organic Synthesis, vol. 14, No. 6 ; pp. 778-784 ; 2017 ; Abstract Only ; 1 Page.

Xiao, et al. ; Preparation and properties of xanthan modified waterborne polyurethane ; Thermosetting Resin, vol. 34, Issue 3 ; pp. 7-10 ; Abstract Only ; 2 Pages.

* cited by examiner

FIG. 8

METHOD OF USING WATER ERODIBLE MARINE ANTIFOULING COATING

STATEMENT REGARDING PRIOR DISCLOSURES BY THE INVENTORS

Aspects of this technology are described in an article "Water-Erodible Xanthan-Acrylate-Polyurethane Antifouling Coating" by Mohammad Mizanur Rahman, Md. Hasan Zahir, Mohammad Abu Jafar Mazumder, and A. Madhan Kumar, in *Polymers* 2019, 11 (10), 1700; doi: 10.3390/polym11101700, which is incorporated herein by reference in its entirety.

STATEMENT OF ACKNOWLEDGEMENT

This project was prepared with support provided by the Deanship of Scientific Research (DSR) at King Fand University of Petroleum and Minerals (KFUPM), Project No. SB171008

BACKGROUND OF THE INVENTION

Technical Field

The present invention relates to a method of using a waterborne polyurethane (WBPU) crosslinked with acrylic acid functionalized polysaccharide as an antifouling coating.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The pollution of marine environments from toxic biocides is a serious problem worldwide. Although pollution has been reduced by restricting the use of tin-based biocides, copper and other toxic organic biocides are still being used and are threatening marine environments. Almost all of the current commercial antifouling coatings contain either copper or a toxic biocide. The burst release, which occurs at the very early stage of a coating being immersed, and other uncontrolled release of biocides also increase the pollution. Thus, it is important to use a coating that can control biocide leaching. See Rahman, M. M.; Chun, H. H.; Park, H. J. Waterborne polysiloxane-urethane-urea for potential marine coatings *J Coat Technol Res* 2011, 8, 389-399; Brady, R. F. Clean Hulls Without Poisons: Devising and Testing Nontoxic Marine Coatings *J Coat Technol* 2000, 72, 45-56; Champ, M. A. A Review of Organotin Regulatory Strategies, Pending Actions, Related Costs and Benefits *Sci Total Envir* 2000, 258, 21-78; Champ, M. A. The Need for the Formation of an Independent, International Marine Coatings Board *Mar Poll Bull* 1999, 38, 239-246; and Yebra, D. M.; Kiil, S.; Kim, D. H. Antifouling Technology-past present and future steps towards efficient and environmentally friendly antifouling coatings *Prog Org Coat* 2004, 50, 75-104, each incorporated herein by reference in their entirety.

Different polymer-based fouling-resistant (mainly siloxane- and fluoro-based compounds) and self-polishing coatings (SPCs) show promising results for combating fouling. In both cases, however, environmentally harmful polymers are used. Recently, the use of environmentally friendly polymers to further reduce the toxicity of the final coating has been encouraged. Such polymers are attractive in different applications but have not yet been used for antifouling coatings. Only a few researchers have used environmentally friendly polymers of biodegradable monomers in antifouling coatings. See Loriot, M.; Linossier, I.; Rehal, K. V.; Fay, F. Influence of biodegradable polymer properties on antifouling paints activity *Polymers* 2017, 9, 36-227; Brady, R. F. Properties which Influence Marine Fouling Resistance in Polymers Containing Silicon and Fluorine *Prog Org Coat* 1999, 35, 31-35; Genzer, J.; Efimenko, K. Recent Developments in Superhydrophobic Surfaces and their Relevance to Marine Fouling: a Review *Biofouling* 2006, 22, 339-360; Callow, M. E.; Callow, J. A. Marine Biofouling: a Sticky Problem *Biologist* 2002, 49, 1-5; and Brady, R. F.; Singer, I. L. Mechanical Factors Favoring Release from Fouling Release Coatings *Biofouling* 2000, 15, 73-81, each incorporated herein by reference in their entirety.

Over the last decade, biodegradable antifouling coatings have become more attractive due to their environmentally friendly properties. See Loriot et al. (2017). Polycaprolactone (PCL) is mainly used for this purpose. PCL mixed with other monomers or polymers can easily degrade or erode (in the presence of water) under natural conditions. The degradation rate depends on the chemical structure and molecular weight of the polymer. Overall, the polymer degradation property improves the antifouling performance. See Loriot et al. (2017).

Xanthan (Xn) is another biodegradable polymer that has various applications in the food and pharmaceutical industries. Xanthan is an extracellular polysaccharide of the bacteria *Xanthomonas campestris*. However, it is difficult to apply in the coating sector, especially for antifouling coatings due to high solubility in water. See Kumar, A.; Rao, K. M.; Han S. S. Application of xanthan gum as polysaccharide in tissue engineering *Carbohydr Polym* 2018, 180, 128-144; and Petri, D. F. S. Xanthan gum: A versatile biopolymer for biomedical and technological applications *J Appl Polym Sci* 2015, 132, each incorporated herein by reference in their entirety.

Waterborne polyurethane (WBPU) is an environmentally friendly polymer. WBPU has found diverse applications in finishing, impregnating, stiffener, and protective coating materials and in adhesives in the leather, textile, and furniture industries. Recently, the use of different biodegradable and plant-resource monomers has made PU more environmentally friendly. PU created using lignin, polysaccharides, and plant oil shows promising properties in certain applications. See Rahman, M. M.; Hasneen, A.; Lee, W. K.; Lim, K. T. Preparation and properties of sol-gel waterborne Polyurethane Adhesive *J Sol-gel Sci Tech* 2013, 67, 473-479; Rahman, M. M.; Hasneen, A.; Chung, I. D.; Kim, H. D.; Lee, W. K.; Chun, J. H. Synthesis and properties of polyurethane coatings: the effect of different types of soft segments and their ratios *Com Interfaces* 2013, 20, 15-26; and Rath, S. K.; Chavan, J. G.; Sasane, S.; Jagannath; Patri, M.; Samui, A. B.; Chakraborty, B. C. "Two component silicone modified epoxy foul release coatings: Effect of modulus, surface energy and surface restructuring on pseudobarnacle and macrofouling behavior." *J Appl Surface Sci* 2009; 256: 2440-2446, each incorporated herein by reference in their entirety.

Hydrolysable polymers are typically used in SPC antifouling coatings to maintain their proper erodible rate. Eventually, this process will create a self-polishing surface with time, which supports the timely and proper release of biocides. Different silyl acrylates are attractive in this regard. Unfortunately, the performance of silyl acrylate highly depends on the wave motion as well as the silyl acrylate content, which usually attach as a pendant group. See Almeida, M.; Diamantino, T. C.; de Sousa, O. Marine Paints: The Particular Case of Antifouling Paints. *Prog. Org. Coat.* 2007, 59, 2-20, incorporated herein by reference in its entirety. Such a type of SPC coating may face a large challenge in fixed offshore structures due to insufficient wave motion.

Few researchers have reported sufficient antifouling performance of PU coatings in both SPC coatings and fouling-resistant coatings. See Rahman et al. (2011); Rahman, M. M.; Chun, H. H.; Park, H. Preparation and properties of waterborne polyurethane-silane: A promising antifouling coating *Macro Research* 2011, 19, 8-13; Kim, B. J.; Park, S. M.; Jo, N. J. Self polishing properties of antifouling paint resins based on polyurethanes according to the types of polyol *Polymer (Korea)* 2017, 41, 811-819; and Kim, B. W.; Kang, T. W.; Park, H.; Lee, I. W.; Chun, H. H.; Jo, N. J. Self polishing behavior of zinc based copolymer with different monomer composition *Mac Res* 2014, 9, 978-982, each incorporated herein by reference in their entirety.

Similar to other SPC coatings, the PU-based SPC coating performance also depends on hydrolytic degradation, which depends on the PU molecular weight and its structure, as well as the hydrolysable pendant group.

In view of the forgoing, one objective of the present invention is to provide a composition containing a mixture of a water-soluble biodegradable polymer (Xn or XnAc) and WBPU (to produce WBPU-Xn and WBPU-XnAc, respectively) to make an erodible coating with improved antifouling.

BRIEF SUMMARY OF THE INVENTION

According to a first aspect, the present disclosure relates to a method of inhibiting marine fouling of a surface. The method involves contacting the surface with a composition to produce a coated surface. The coated surface is dried to produce a treated surface having a deposited film. The composition comprises a waterborne polyurethane (WBPU) crosslinked with an acrylic acid functionalized polysaccharide, water, and a preservative dispersed in the crosslinked WBPU.

In one embodiment, the acrylic acid functionalized polysaccharide is present at a weight percentage of 0.1-2.0 wt % relative to a total weight of the composition.

In one embodiment, the acrylic acid functionalized polysaccharide is present in the deposited film at a weight percentage in a range of 0.1-5.0 wt % relative to a total weight of the deposited film.

In one embodiment, the polysaccharide is derived from a microorganism.

In one embodiment, the polysaccharide is at least one selected from the group consisting of xanthan, beta-glucan, dextran, inulin, galactan, glycogen, hemicellulose, levan, lignin, mannan, pectin, amylopectin, and amylose.

In one embodiment, the acrylic acid functionalized polysaccharide comprises 1-50 wt % acrylic acid functional groups relative to a total weight of the acrylic acid functionalized polysaccharide.

In one embodiment, the polysaccharide is xanthan.

In one embodiment, the composition comprises 50-90 wt % water relative to a total weight of the composition.

In one embodiment, the preservative is present at a weight percentage of 0.01-2.0 wt % relative to a total weight of the composition.

In one embodiment, the composition further comprises a pigment.

In one embodiment, the composition consists of the crosslinked WBPU, the preservative, and water.

In one embodiment, the contacting is done by electrocoating, spraying, electrostatic spraying, dipping, rolling, brushing, dropping, spin coating.

In one embodiment, the preservative is zinc pyrithione.

In one embodiment, the deposited film has a density in a range of 0.8-2.0 g/cm$^3$.

In one embodiment, the deposited film has a number average molecular weight of crosslinked WBPU in a range of 26-32 kDa.

In a further embodiment, the number average molecular weight decreases to 22-24 kDa following at least 24 h of immersion in water, seawater, or brine.

In one embodiment, the deposited film has a water contact angle in a range of 45°-67°.

In one embodiment, the deposited film, when immersed in water, seawater, or brine for at least 24 hours, absorbs no more than 15 wt % water in relation to a weight of the deposited film.

In one embodiment, the deposited film is in the form of a layer in direct contact with the surface, the deposited film having an average thickness in a range of 1-200 µm.

In one embodiment, the deposited film, when placed in contact with water, seawater, or brine for 80-100 days, has a dry weight loss in a range of 1.5-8.0 wt % relative to an initial dry weight.

In one embodiment, the deposited film has an adhesive strength in a range of 3.8-4.5 Kgf/cm.

In one embodiment, the adhesive strength decreases to 1.8-3.5 Kgf/cm following at least 24 h of immersion in water, seawater, or brine.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 8 shows photograph of coatings after certain periods of immersion.

DETAILED DESCRIPTION OF THE EMBODIMENTS

Figure 1A:
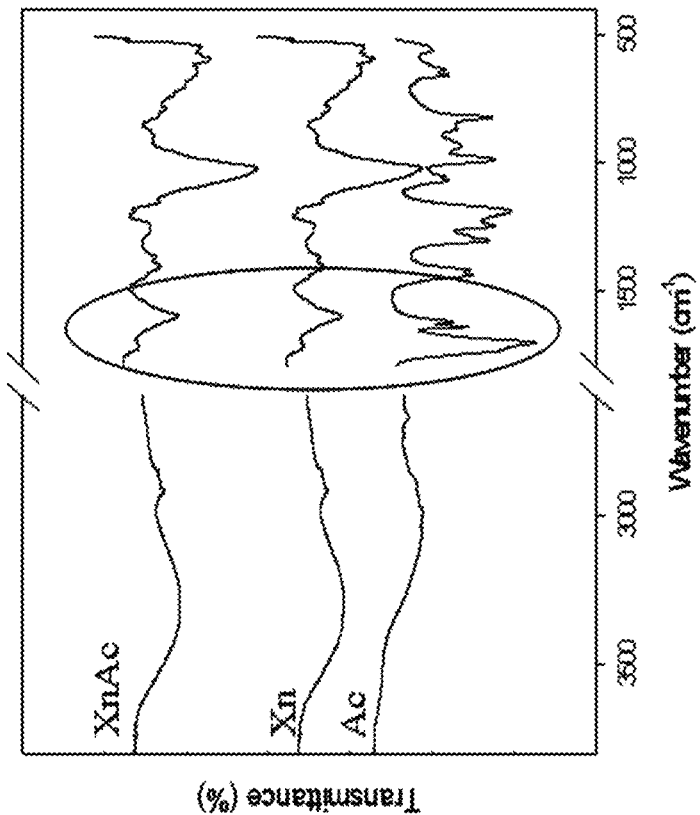
FIG. 1A shows FT-IR spectra of Xn and XnAc polymers.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, when comparing two numerical values, "percent difference" refers to the absolute difference between the two values, divided by the average of the two values, all multiplied by 100.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted or when heating a material. For example, $Ni(NO_3)_2$ includes anhydrous $Ni(NO_3)_2$, $Ni(NO_3)_2 \cdot 6H_2O$, and any other hydrated forms or mixtures. $CuCl_2$ includes both anhydrous $CuCl_2$ and $CuCl_2 \cdot 2H_2O$.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopes of nickel include $^{58}Ni$, $^{60}Ni$, $^{61}Ni$, $^{62}Ni$, and $^{64}Ni$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present disclosure relates to a method of inhibiting marine fouling of a surface. The method involves contacting the surface with a composition to produce a coated surface. The coated surface is dried to produce a treated surface having a deposited film (or dried film). The composition comprises a waterborne polyurethane (WBPU) crosslinked with an acrylic acid functionalized polysaccharide, water, and a preservative dispersed in the crosslinked WBPU.

As described herein, marine fouling, also called biofouling or biological fouling, is the accumulation of microorganisms, plants, algae, or small animals on wetted surfaces. Typically the wetted surfaces have a mechanical function, and the biofouling may cause structural or other functional deficiencies. It is estimated that over 1,700 species comprising over 4,000 organisms are responsible for biofouling. Biofouling is divided into microfouling (i.e. biofilm formation and bacterial adhesion) and macrofouling (i.e. the attachment of larger organisms). Due to the distinct chemistry and biology that determines what prevents them from settling, organisms are also classified as hard- or soft-fouling types. Calcareous (hard) fouling organisms include barnacles, encrusting bryozoans, mollusks, polychaete and other tube worms, and zebra mussels. Examples of non-calcareous (soft) fouling organisms are seaweed, hydroids, algae, and biofilms. Marine fouling is most significant economically to shipping industries, since fouling on a ship's hull significantly increases drag, reducing the overall hydrodynamic performance of the vessel, and increasing the fuel consumption.

As mentioned above, the composition comprises a waterborne polyurethane (WBPU) crosslinked with an acrylic acid functionalized polysaccharide, and a preservative dispersed in the crosslinked WBPU.

A polyurethane is a binder (or polymer) prepared from compounds that comprise an isocyanate moiety. The polyurethane urethane moiety can form intermolecular hydrogen bonds between urethane binder polymers, and these non-covalent bonds confer useful properties in a coating or film comprising a polyurethane. The hydrogen bonds can be broken by mechanical stress, but will reform, thereby conferring a property of abrasion resistance. Additionally, a polyurethane can form some hydrogen bonds with water, conferring a plasticizing property to the coating. The isocyanate moiety is highly reactive (e.g., crosslinkable) with other functional groups comprising a chemically reactive hydrogen. Examples of a chemically reactive hydrogen moiety include a hydroxyl moiety, an amine moiety, or a combination thereof. Examples of additional crosslinkers used in a polyurethane include a polyol, an amine, an epoxide, silicone, vinyl, phenolic, or a combination thereof. In certain embodiments, a urethane coating is a thermosetting coating. In other embodiments, a urethane coating comprises a catalyst. Example catalysts include but are not limited to dibutyltindilaurate (DBTDL), stannous octoate, and zinc octoate. In specific facets, the coating comprises 10 to 100 parts per million catalyst, including all intermediate ranges and combinations thereof. In some embodiments, a polyurethane coating will undergo film formation at ambient conditions or slightly greater temperatures.

In general embodiments, a polyurethane may be selected based on the materials used in its preparation, which typically affect the polyurethane's properties. An example of a polyurethane includes an aromatic isocyanate urethane binder, an aliphatic isocyanate urethane binder, or a combination thereof. Aliphatic isocyanate polyurethanes are often selected for embodiments wherein a superior exterior durability, color stability, good lightfastness, or a combination thereof relative to an aromatic isocyanate binder is desired. Examples of an aliphatic isocyanate polyurethane include a hydrogenated bis(4-isocyanatophenyl)methane (also called 4,4-dicyclohexylmethane diisocyanate, or $H_{12}MDI$ or HMDI), hexamethylene diisocyanate (HDI), a combination of 2,2,4-trimethyl hexamethylene diisocyanate and 2,4,4-trimethyl hexamethylene diisocyanate ("TMHDI"), 1,4-cyclohexane diisocyanate ("CHDI"), isophorone diisocyanate ("3-isocyanatomethyl-3,5,5-trimethylcyclohexyl isocyanate," "IPDI"), or a combination thereof. In certain aspects, a HDI derived binder is prepared from excess HDI reacted with water, known as "HDI biuret." In certain aspects, a HDI derived binder may be prepared from a 1,6-hexamethylene diisocyanate isocyanurate, wherein such a HDI derived binder produces a coating with generally superior heat resistance and/or exterior durability and is desired relative to other HDI derived binders. As would be known to one of ordinary skill in the art, standards for physical properties, chemical properties, and/or procedures for testing the purity/properties of urethane precursor components (e.g., toluene) and urethane resins (e.g., isocyanate moieties) for use in a coating are described, for example in "ASTM Book of Standards, Volume 06.04, Paint—Solvents; Aromatic Hydrocarbons," D5606-01, 2002; and "ASTM Book of Standards, Volume 06.03, Paint—Pigments, Drying Oils, Polymers, Resins, Naval Stores, Cellulosic Esters, and Ink Vehicles," D3432-89 and D2572-97, 2002.

The polyisocyanate component can comprise any suitable isocyanate. Suitable polyisocyanates include, for example, multifunctional isocyanates. Examples of multifunctional isocyanates include aliphatic diisocyanates like hexamethylene diisocyanate and isophorone diisocyanate, and aromatic diisocyanates like toluene diisocyanate and 4,4'-diphenylmethane diisocyanate. The polyisocyanates can be blocked or unblocked. Examples of other suitable polyisocyanates include isocyanurate trimers, allophanates, and uretdiones of diisocyanates. Suitable polyisocyanates are well known in the art and widely available commercially. For example, suitable polyisocyanates are disclosed in U.S. Pat. No. 6,316,119 at columns 6, lines 19-36, incorporated by reference herein. Examples of commercially available polyisocyanates include DESMODUR N3390, which is sold by Bayer Corporation, and TOLONATE HDT90, which is sold by Rhodia Inc. In a preferred embodiment, the isocyanate is 4,4-dicyclohexylmethane diisocyanate, or $H_{12}MDI$.

In certain embodiments, the polyurethane coating is formed from a polyurethane capable of a self-crosslinking reaction. An example is a moisture-cure urethane, which comprises an isocyanate moiety. Contact between an isocyanate moiety and a water molecule produces an amine moiety capable of bonding with an isocyanate moiety of another polyurethane molecule in a linear polymerization reaction. In certain aspects, a moisture cure urethane coating is baked at 100° C. to 140° C., including all intermediate ranges and combinations thereof, to promote crosslinking reactions between the linear polymers. In certain embodiments, a moisture-cure urethane coating is a solvent-borne coating. In specific aspects, a moisture-cure urethane coating comprises a dehydrator. In general aspects, moisture-cure urethane coating typically is a one-pack coating, prepared for storage of the coating in anhydrous conditions.

In certain embodiments, a urethane coating comprises an additional crosslinker. In certain embodiments, a urethane may be combined with a crosslinker such as an amine, an epoxide, silicone, vinyl, phenolic, a polyol, or a combination thereof, wherein the crosslinker comprises a reactive hydrogen moiety. In specific embodiments, selection of a second crosslinker to crosslink with the polyurethane affects coating and/or film properties. In certain aspects, a coating comprising a urethane and an epoxide, vinyl, phenolic, or a combination thereof produces a film with good chemical resistance. In other aspects, a coating comprising a urethane and a silicone produces a coating with good thermal resistance.

In some embodiments, the polyurethane comprises a polyol. A primary hydroxyl moiety, secondary hydroxyl moiety, and tertiary hydroxyl moiety of a polyol are respectively the fastest, moderate, and slowest to react with a urethane. Steric hindrance from a neighboring moiety may slow the reaction with a hydroxyl moiety. In an additional example, use of a polyol may increase flexibility of a urethane coating. Often, a selected polyol has a number average molecular weight from 200 Da to 3,000 Da, preferably from 500 Da to 2,800 Da, more preferably 800 Da to 2,500 Da, even more preferably 1,500 Da to 2,200 Da, or about 2,000 Da, including all intermediate ranges and combinations thereof. Generally, a lower molecular weight polyol increases the hardness property, lowers the flexibility property, or a combination thereof, of a urethane polyol film. Examples of a polyol include poly(tetramethyleneoxide glycol) (PTMG), poly(tetramethylene adipate glycol) a glycol, a triol (e.g., 1,4-butane-diol, diethylene glycol, trimethylolpropane), a polysaccharide, a tetraol, a polyester polyol, a polyether polyol, an acrylic polyol, a polylactone polyol, or a combination thereof. Examples of a polyether polyol include a poly (propylene oxide) homopolymer polyol, a poly (propylene oxide) and ethylene oxide copolymer polyol, or a combination thereof.

Other polyols may include, but are not limited to, small molecules containing more than one hydroxyl group, for example neopentyl glycol, glycerol, 2,2-bis(hydroxymethyl) propionic acid (dimethylolpropionic acid or DMPA), isosorbide, pentaerythritol and/or propanediol, or polymeric polyols such as a polyester polyols or an acrylic polyols. Suitable polyols are widely commercially available. Particularly suitable polyols have a number average molecular weight as determined by GPC ("Mn") of 500 to 100,000, such as 500 to 10,000. In certain embodiments, the polyols can have hydroxyl values of 20 to 400, such as 40 to 300; in other embodiments, the hydroxyl value can range from 1,200 to 2,100, such as 1,400 to 1,900.

In one embodiment, a polyurethane may comprise other crosslinkers. Any suitable crosslinker can be used, including any of the polyisocyanates listed above, aminoplasts, polyepoxides, beta hydroxyalkylamines, polyacids, anhydrides, organometallic acid-functional materials, polyamines, polyamides, polysaccharides, and mixtures of any of the foregoing.

A water-borne polyurethane typically comprises a water-dispersible urethane binder such as a cationic modified urethane binder and/or anionic modified urethane binder. A cationic modified polyurethane is a polyurethane chemically modified by an diol comprising an amine, such as, for example, diethanolamine, methyl diethanolamine, N,N-bis (hydroxyethyl)-α-aminopyridine, lysine, N-hydroxyethylpiperidine, or a combination thereof. An anionic modified polyurethane is a urethane binder chemically modified by an diol comprising a carboxylic acid such as dimethylolpropionic acid (2,2-bis(hydroxymethyl) propionic acid, DMPA), dihydroxybenzoic acid, and/or a sulfonic acid (e.g., 2-hydroxymethyl-3-hydroxy-propanesulfonic acid), or a combination thereof. In a preferred embodiment, the WBPU is an anionic modified polyurethane, and is modified by dimethylolpropionic acid.

In one embodiment, the composition comprises water at a weight percentage in a range of 50-90 wt %, preferably 55-85 wt %, more preferably 60-80 wt %, even more preferably 65-75 wt %, or about 70 wt %, relative to a total weight of the composition. In one embodiment, the composition may further comprise a solvent that is not water. For instance, an organic solvent may be present at a weight percentage of less than 20 wt %, less than 10 wt %, less than 5 wt %, or less than 2 wt %, or less than 1 wt %, relative to a total weight of the composition. If a non-water solvent is used in minimal quantities, it can be any suitable organic solvent such as glycols, glycol ether alcohols, alcohols, ketones, and aromatics such as xylene and toluene, acetates, mineral spirits, naphthas, and/or mixtures thereof. The solvents may be biomass derived. Examples of biomass derived solvents include esters of lactic acid and esters of soybean oil fatty acids.

In one embodiment, the composition comprises a waterborne polyurethane (WBPU) crosslinked with a polysaccharide. Polysaccharides are long chains of carbohydrate molecules, specifically polymeric carbohydrates composed of monosaccharide units bound together by glycosidic linkages. In one embodiment, a polysaccharide comprises more than 10 monosaccharide units, for instance, between 40 and 3,000 monosaccharide units. In one embodiment, the polysaccharide has a number average molecular weight or a weight average molecular weight in a range of 200 kDa-10 MDa, 300 kDa-8 MDa, 500 kDa-6 MDa, 750 kDa-5 MDa. In one embodiment, the polysaccharide has a number average molecular weight or a weight average molecular weight of at least 200 kDa, at least 300 kDa, at least 500 kDa, at least 750 kDa, at least 1 MDa, at least 2 MDa, at least 3 MDa, at least 4 MDa, at least 5 MDa, at least 6 MDa, or at least 7 MDa.

In one embodiment, the polysaccharide is present in the composition at a weight percentage of 0.1-2.0 wt %, preferably 0.5-1.7 wt %, more preferably 0.8-1.5 wt %, more preferably 0.9-1.2 wt %, or about 1.0 wt % relative to a total weight of the composition. In one embodiment, the polysaccharide is present in the deposited film at a weight percentage in a range of 0.1-5.0 wt %, preferably 0.5-4.5 wt %, more preferably 1.0-4.0 wt %, even more preferably 1.5-3.5 wt %, or 2.0-3.5 wt %, or 2.5-3.5 wt %, or about 3.2 wt % relative to a total weight of the deposited film.

In one embodiment, the polysaccharide may be derived from plant, animal, and/or microbial sources. Example polysaccharides include but are not limited to maltodextrins, starches, cellulose, gums (e.g., gum arabic, guar, and xanthan), alginates, pectin, and gellan. Suitable starches include those derived from maize, potato, tapioca, wheat, rice, pea, sago, oat, barley, rye, and amaranth, including conventional hybrids or genetically engineered materials. Other polysaccharides include hemicellulose or plant cell wall polysaccharides such as D-xylans. In one embodiment, the polysaccharide is at least one selected from the group consisting of xanthan, beta-glucan, dextran, inulin, galactan, glycogen, hemicellulose, levan, lignin, mannan, pectin, amylopectin, and amylose. Beta-glucans include but are not limited to oat beta-glucan, lentinan, sizofiran, zymosan, cellulose, and chitin. Other polysaccharides include callose, laminarin, chrysolaminarin, xylan, arabinoxylan, fucoidan, welan, diutan, pullulan, hyaluronic acid, curdlan, zooglan, succinoglycan, and galactomannan.

In one embodiment, the polysaccharide is derived from a microorganism. Here, the polysaccharide may be xanthan, gellan, dextran, pullulan, cellulose, hyaluronic acid, curdlan, alginate, chitosan, zooglan, succinoglycan, scleroglucan, and/or emulsan. In a preferred embodiment, the polysaccharide is derived from bacteria.

In one embodiment, the polysaccharide may be a neutral polysaccharide. As described herein, a "neutral polysaccharide" is a polymer comprising a majority of neutral sugars, wherein the neutral sugar is typically a hexose or a pentose, and/or an aminosugar thereof. Examples of neutral sugars found in neutral polysaccharides include arabinose, galactose, 3-O-methyl-D-galactose, mannose, xylose, rhamnose, glucose, fructose, or a combination thereof. Examples of amino sugars found in neutral polysaccharides include glucosamine, galactosamine, or a combination thereof.

In one embodiment the polysaccharide has a thickening effect when mixed with an aqueous solution. For instance, a 1 wt % solution of the polysaccharide in water may have a viscosity, or a Brookfield viscosity, in a range of 800-1200 cps.

In a preferred embodiment, the polysaccharide is xanthan (also called xanthan gum), and is produced by the bacteria species *Xanthomonas campestris*. Xanthan may comprise pentasaccharide repeat units of glucose, mannose, and glucuronic acid in a molar ratio of 2:2:1.

In one embodiment, the polysaccharide may be modified or derivatized by acrylic acid treatment, etherification (e.g., via treatment with propylene oxide, ethylene oxide, 2,3-epoxypropyltrimethylammonium chloride), esterification (e.g., via reaction with acetic anhydride, octenyl succinic anhydride (OSA)), acid hydrolysis, dextrinization, oxidation or enzyme treatment (e.g., starch modified with α-amylase, β-amylase, pullanase, isoamylase, or glucoamylase), or various combinations of these treatments.

In one embodiment, the polysaccharide is functionalized. In one embodiment, the polysaccharide is functionalized to include residues of acrylic acid, methacrylic acid, or combinations thereof. In one example, the polysaccharide includes acrylic acid residues. The residues of acrylic acid and methacrylic acid may be derived from acrylic acid and methacrylic acid monomers, or may be generated from a hydrolyzable monomer. For example, a methacrylic acid residue may be partially or completely hydrolyzed from methyl methacrylic acid. The residues of acrylic acid and methacrylic acid may also be present as lithium, sodium, and potassium salts.

In one embodiment, the polysaccharide is functionalized with acrylic acid groups where the acrylic acid functionalized polysaccharide comprises 1-50 wt %, preferably 2-45 wt %, more preferably 5-40 wt %, even more preferably 8-30 wt % acrylic acid functional groups relative to a total weight of the acrylic acid functionalized polysaccharide.

In a further embodiment, the composition comprises a waterborne polyurethane (WBPU) crosslinked with an acrylic acid functionalized polysaccharide. In one embodiment, the acrylic acid functionalized polysaccharide is present in the composition at a weight percentage of 0.1-2.0 wt %, preferably 0.5-1.7 wt %, more preferably 0.8-1.5 wt %, more preferably 0.9-1.2 wt %, or about 1.0 wt % relative to a total weight of the composition. In one embodiment, the acrylic acid functionalized polysaccharide is present in the deposited film at a weight percentage in a range of 0.1-5.0 wt %, preferably 0.5-4.5 wt %, more preferably 1.0-4.0 wt %, even more preferably 1.5-3.5 wt %, or 2.0-3.5 wt %, or 2.5-3.5 wt %, or about 3.2 wt % relative to a total weight of the deposited film.

In one embodiment, a weight ratio of the acrylic acid functionalized polysaccharide to the WBPU is in a range of 0.005-0.500, preferably 0.010-0.200, more preferably 0.02-0.100, even more preferably 0.020-0.050, 0.025-0.040, or about 0.03. This weight ratio may apply to the acrylic acid functionalized polysaccharide and the WBPU in the composition and/or the deposited film.

In one embodiment, a polysaccharide, with or without acrylic acid functionalization, may be crosslinked to the carboxyl and hydroxyl (OH) groups of the WBPU.

In one embodiment, the composition may have a pH in a range of 6.0-8.0, preferably 6.2-7.4, more preferably 6.3-7.1, even more preferably 6.4-6.9, or 6.5-6.8, or 6.5-6.7, or about 6.7. In one embodiment the waterborne polyurethane (WBPU) crosslinked with an acrylic acid functionalized polysaccharide may be in the form of particles dispersed throughout the composition. Here, the waterborne polyurethane (WBPU) crosslinked with an acrylic acid functionalized polysaccharide may have an average particle size in a range of 50-100 nm, preferably 55-90 nm, more preferably 58-80 nm, 60-80 nm, 61-80 nm, or 60-70 nm, or about 61 nm.

In one embodiment, the composition may comprise other optional materials well known in the art of formulating coatings in any of the components, such as preservatives, pigments, abrasion resistant particles, plasticizers, anti-oxidants, hindered amine light stabilizers, UV light absorbers and stabilizers, surfactants, flow control agents, thixotropic agents, fillers, organic cosolvents, reactive diluents, catalysts, grind vehicles, and other customary auxiliaries.

In one embodiment, the composition comprises a pigment. The pigment may be an organic dye, such as an azo dye, an acid dye, a basic dye, a direct dye, a disperse dye, a solvent dye, a mordant dye, a pigment dye, an azoic diazo component dye; Citrus Red 2; Congo Red; hydroxynaphthol blue; methyl red; Janus Green B; trypan blue; calconcarboxylic acid; methyl orange; methyl yellow; Evans Blue; azobenzene; or some other organic dye. In another embodiment, the pigment may be an inorganic pigment, such as titanium dioxide, clay, calcium carbonate, iron oxide, white lead, zinc oxide, zinc sulfide. In one embodiment, the pigment may be present in the composition at a weight percentage of 0.001-1 wt %, preferably 0.01-0.8 wt %, more preferably 0.1-0.7 wt %, each relative to a total weight of the composition. In another embodiment, the pigment may be present in the deposited film at a weight percentage in a range of 0.001-2 wt %, preferably 0.01-1.5 wt %, more preferably 0.1-1.0 wt %, each relative to a total weight of the deposited film.

In one embodiment, the composition comprises a preservative. The preservative may be present in the composition at a weight percentage of 0.01-2.0 wt %, preferably 0.1-1.8 wt %, more preferably 0.2-1.5 wt %, even more preferably 0.3-1.2 wt %, 0.3-1.0 wt %, 0.3-0.8 wt %, 0.4-0.7 wt %, or about 0.5 wt % relative to a total weight of the composition. The preservative may be present in the deposited film at a weight percentage of 0.1-4.0 wt %, preferably 0.5-3.5 wt %, more preferably 1.0-3.0 wt %, even more preferably 1.2-2.5 wt %, 1.3-2.0 wt %, 1.3-1.8 wt %, or about 1.6 wt %, relative to a total weight of the deposited film. In one embodiment, the composition and/or the deposited film consists of the crosslinked WBPU, water, and the preservative.

In one embodiment, the preservative may be a biocide or an antifouling biocide. In other embodiments, the preservative may be considered a fungicide, an herbicide, a pesticide, an insecticide, an antibiotic, an antimicrobial, a bactericide, an algicide, a slimicide, a molluscicide, a nematicide, and/or a biopesticide. In one embodiment, the preservative may be zinc pyrithione, 4,5-dichloro-2-n-octyl-4-isothiazolin-3-one (known as DCOIT and the active ingredient of SEA NINE 211®), TCMS pyridine (2,3,3,6-tetrachloro-4-methylsulfonyl pyridine), 2-pyridinethiol-1-oxide copper complex (copper pyrithione), copper(I) thiocyanate, 2-methylthio-4-tert-butylamino-6-amino-s-triazine, tributyltin oxide (TBTO), tributyltin chloride, DCMU or DIURON® (1-(3,4-dichlorophenyl)-3,3-dimethylurea), dichlofuanid (N-dichlorofluoromethylthio-N0-dimethyl-N-phenylsulphamide), chlorothalonil (2,4,5,6-tetrachloroisophthalonitrile), 2-methylthio-4-terbutylamino-6-cyclopropylamino-s-triazine (IRGAROL-1051®), zineb (zinc ethylenebis-(dithiocarbamate)), capsaicin (8-methyl-n-vanillyl-6-nonenamide), 2-(p-chlorophenyl)-3-cyano-4-bromo-5-trifluoromethyl pyrrole (ECONEA®), medetomidine (4-[1-(2,3-dimethylphenyl)ethyl]-3H-imidazole), benzalkonium chloride, dichlorophen, or combinations thereof. In another embodiment the preservative may be some other metal coordination complex. In a preferred embodiment, the preservative is zinc pyrithione.

As mentioned previously, the method of inhibiting marine fouling of the surface involves contacting the surface with the composition to produce a coated surface. In one embodiment, the surface may be a part of a boat, a buoy, a pier, a pylon, a raft, a building, a bridge, a sign, a sculpture, an intermodal container, a wire, a cable, a train car, a railing, a cable, a ship, an automobile, a fire hydrant, a mailbox, a bicycle, a fence, a scaffolding, a pipeline, an oil well, a gas well, a storage tank, a construction equipment, a battery, a chain link, or a piece of furniture. Preferably the surface may be located outdoors, and in a marine environment, though in some instances the steel may be located indoors, such as an air duct, an exhaust hood, a plumbing, an electrode, or a part of an appliance. Preferably the surface may be prone to fouling, rusting, or corrosion. For testing purposes, the surface may be an electrode, wire, coupon, chad, scrap, or panel with a total surface area of 0.1-1,800 $cm^2$, preferably 0.5-500 $cm^2$, more preferably 0.5-50 $cm^2$. The surface may be one or more types of carbon steel, stainless steel, weathering steel, steel wool, Eglin steel, austenitic steel, ferritic steel, martensitic steel, and/or some other type of steel. The surface may be some other metal or metal alloy, such as aluminum. In another embodiment, polymeric, plastic, polycarbonate, polyvinyl chloride (PVC), polycarbonate/acrylobutadiene styrene ("PC/ABS"), polyamide, wood, veneer, wood composite, particle board, medium density fiberboard, cement, stone, and the like. In a particularly suitable embodiment of the present invention, the substrate itself is biodegradable. Biodegradable substrates include, for example paper, wood, and biodegradable plastics such as cellulose, poly(lactic acid), poly(3-hydroxybutyrate) and starch based plastics. In addition, the substrate can be one that has been recycled. The substrate may also be one that has already been treated in some manner to impart color or other visual effect. For example, a wood substrate that has been stained may then be coated according to the present invention, as can a surface that has already had one or more other coating layers applied to it.

In one embodiment, the surface may be cleaned before the contacting to remove superficial impurities such as oxides, grime, and dirt. The cleaning may be done by acid etching, UV irradiation, abrasion, sonication, soaking, or scrubbing, and may use water, an acid, a base, a surfactant, and/or an organic solvent from those mentioned previously. The cleaning may involve polishing without using a solution. In one embodiment, the surface may be polished with emery paper or sandpaper and then rinsed with water and dried.

The surface may be contacted with the composition by any means standard in the art, such as electrocoating, spraying, electrostatic spraying, dipping, rolling, brushing, dropping, spin coating, and the like. In one embodiment, the surface may be coated in a way to avoid incorporating air bubbles into the composition. The contacting forms a coated surface where the composition is in direct contact with the surface. An average thickness of the composition may be in a range of 5-5 mm, preferably 10 μm-4 mm, more preferably 50 μm-2 mm, even more preferably 80 μm-1 mm, or 80 μm-1.5 mm, or about 100 μm.

The coated surface is dried to produce a treated surface, where the treated surface comprises the surface in direct contact with a deposited film. The coated surface may be dried at a temperature in a range of 20-90° C., preferably 25-85° C., more preferably 30-80° C., even more preferably 45-75° C., or about 70° C., for a time period in a range of 1-48 h, preferably 4-36 h, more preferably 12-30 h, even more preferably 16-28 h, or about 24 h at ambient pressure. In another embodiment, the coated surface may be dried in a desiccator or by being exposed to a flow of a dry, inert gas, such as $N_2$. In another embodiment, the coated surface may be dried under vacuum. In a preferred embodiment, the coated surface may be dried at room temperature (for instance, 22-27° C.) to evaporate a majority of the water from the composition. Then, drying may proceed at a higher temperature (for instance, 65-75° C.) to evaporate any trace solvents.

An average thickness of the deposited film may be in a range of 1-200 μm, preferably 10-180 μm, more preferably 20-160 μm, even more preferably 40-110 μm, 50-100 μm, 55-80 μm, 55-75 μm, 55-70 μm, 55-65 μm, or about 60 μm. In one embodiment, the deposited film is physically adsorbed to the surface.

In one embodiment, the deposited film is hydrophilic, here meaning that the deposited film has a water contact angle of less than 90°. In one embodiment, the deposited film has a water contact angle in a range of 45°-67°, preferably 48°-66°, more preferably 55°-65°, even more preferably 60°-64°, 61°-63°, or about 62°.

In one embodiment, the deposited film has a density in a range of 0.8-2.0 g/cm$^3$, preferably 0.9-1.9 g/cm$^3$, more preferably 1.0-1.8 g/cm$^3$. In one embodiment, the deposited film is free of pores and/or air bubbles. In one embodiment, the deposited film is not a foam.

In one embodiment, the deposited film has a number average molecular weight, or a weight average molecular weight, of crosslinked WBPU in a range of 26-32 kDa, preferably 26.5-31 kDa, more preferably 27-30 kDa, more preferably 27.5-29 kDa, or about 28 kDa. In one embodiment, the number average molecular weight of the crosslinked WBPU in the composition is similar to the number average molecular weight of the crosslinked WBPU in the deposited film, meaning that the two number average molecular weights have a percent difference of 2% or less, preferably 1% or less. Similarly, in one embodiment, the weight average molecular weight of the crosslinked WBPU in the composition is similar to the weight average molecular weight of the crosslinked WBPU in the deposited film, meaning that the two weight average molecular weights have a percent difference of 2% or less, preferably 1% or less.

As mentioned previously, in one embodiment, the deposited film consists of the crosslinked WBPU, water, and the preservative. The deposited film may comprise 0.5-10 wt % water, 0.6-5 wt % water, or 0.7-3 wt % water, or about 0.8-2 wt % water relative to a total weight of the deposited film. In one embodiment, the deposited film may comprise less than 0.5 wt % water relative to a total weight of the deposited film. In one embodiment, the deposited film may be essentially free of water or may comprise less than 0.1 wt % water, less than 0.05 wt % water, less than 0.01 wt % water, less than 0.005 wt % water, less than 0.001 wt % water. In one embodiment, the deposited film consists of the crosslinked WBPU and the preservative and does not comprise water.

In one embodiment, the number average molecular weight of the crosslinked WBPU, or the weight average molecular weight, decreases to 22-24 kDa, preferably 22.5-24 kDa, more preferably 22.8-23.8, or about 23.0 kDa following at least 18 h, preferably at least 36 h, more preferably at least 24 h of immersion in, or contact with, water, seawater, or brine. In one embodiment the immersion or contacting period is greater than 4 h, 12 h, 18 h, 24 h, 36 h, or 48 h. In another embodiment, the immersion or contacting period is less than 12 h, 18 h, 24 h, 36 h, or 50 h.

The brine may have a wide salinity range of 500-200,000 ppm, preferably 1,000-100,000 ppm, more preferably 2,500-75,000 ppm. Minerals contained in the brine solution include but are not limited to chloride, sodium, sulfate, magnesium, calcium, potassium, bicarbonate, carbonate, bromide, boron, strontium, and fluoride. In another embodiment, "brine" may be used more generally to refer to an aqueous solution of a salt.

In one embodiment, the deposited film, when immersed in (or in contact with) water, seawater, or brine for at least 24 hours, absorbs no more than 15 wt %, preferably no more than 14 wt %, more preferably no more than 13 wt %, more preferably no more than 12 wt %, or about 11 wt % water in relation to a weight of the deposited film. In another embodiment, the immersion or contacting here may be at least 4 h, 12 h, 18 h, 30 h, 36 h, or 48 h. In another embodiment, the immersion or contacting period is less than 8 h, 12 h, 18 h, 24 h, 36 h, or 60 h.

In one embodiment, the deposited film, when placed in contact with water, seawater, or brine for 80-100 days, has a dry weight loss in a range of 1.5-8.0 wt %, preferably 1.8-6.0 wt %, more preferably 2.0-5.0 wt %, even more preferably 2.2-4.0 wt %, or 2.3-3.0 wt %, or about 2.5 wt % relative to an initial dry weight. In another embodiment, the deposited film, when placed in contact with water, seawater, or brine for at least 30 days, at least 60 days, more preferably at least 90 days, has a dry weight loss of less than 8.0 wt %, preferably less than 5.0 wt %, more preferably less than 4.0 wt %, even more preferably less than 2.7 wt % relative to an initial dry weight. Here, the dry weight loss refers to the percentage loss of weight that does not include any consideration of weight loss or weight gain from adsorbed or absorbed water. The initial dry weight may be the weight of the deposited film before being placed in contact with water, sea water, or brine.

In one embodiment, the deposited film has an adhesive strength in a range of 3.8-4.5 Kgf/cm, preferably 3.8-4.4 Kgf/cm, more preferably 3.9-4.3 Kgf/cm, even more preferably 4.0-4.2 Kgf/cm, or about 4.1 Kgf/cm. In one embodiment, the adhesive strength of the deposited film decreases by 5-50%, preferably 10-40%, more preferably 20-35%, or about 29% from its initial value after 12-48 h, 18-36 h, 20-30 h, or about 24 h of contact with water, seawater, or brine. In one embodiment, the adhesive strength of the deposited film decreases to 1.8-3.5 Kgf/cm, preferably 2.0-3.2 Kgf/cm, more preferably 2.5-3.1 Kgf/cm, even more preferably 2.7-3.0 Kgf/cm, or about 2.9 Kgf/cm, after 12-48 h, 18-36 h, 20-30 h, or about 24 h of contact with water, seawater, or brine. The examples below are intended to further illustrate protocols for preparing, characterizing the composition of the WBPU and uses thereof, and are not intended to limit the scope of the claims.

Example 1

Materials and Methods

N-Methyl-2-pyrrolidone (NMP, Sigma Aldrich), Acrylic acid (AA), 4,4-dicyclohexylmethane diisocyanate ($H_{12}MDI$, Sigma Aldrich), triethylamine (TEA, Sigma Aldrich), and ethylene diamine (EDA, Sigma Aldrich) were used after dehydration with 4 Å molecular sieves for seven days. Dimethylolpropionic acid (DMPA, Sigma Aldrich), NO-[3-(dimethylaminopropyl)]-N-ethylcarbodiimide hydrochloride (DEC), acetone, ethanol (EA), Xn, and dibutyltindilaurate (DBTDL, Sigma Aldrich) were used as received. Poly(tetramethyleneoxide glycol) (PTMG Mn=2000, Sigma Aldrich) was vacuum dried at 90° C. for three hours prior to use.

Synthesis of XnAc by Functionalization of Xn by AA

A proper amount of Xn (1 g) was dissolved in water (100 mL) under gentle stirring (200 rpm) for 16 h at 20-25° C. The solution was cooled down at 2-4° C. (using an ice bath), and AA was added drop-wise to the mixture. DEC (1.1 mol/mol AA) was added and stirred for 24 h. The solution was moderately viscous after 24 h. The solution was precipitated with acetone (150 mL), filtered, and rinsed alternatively 4 times with EA/water mixtures (1:1) and finally with EA (100 mL). The product was dried under ambient conditions and in a vacuum oven for 24 h.

Waterborne Polyurethane (WBPU) Dispersion Preparation

The prepolymer process was applied during the synthesis of the WBPU dispersion (solid content of approximately 30 wt %). See Rahman, M. M.; Hasneen, A.; Lee, W. K.; Lim, K. T. Preparation and properties of sol-gel waterborne Polyurethane Adhesive *J Sol-gel Sci Tech* 2013, 67, 473-479—incorporated herein by reference in its entirety. By charging $H_{12}MDI$, DMPA, and PTMG, a NCO-terminated prepolymer was obtained in the presence of a DBTDL catalyst. Methyl ethyl ketone (MEK) (10 wt %) was added to control the viscosity of the prepolymer. The carboxyl group of the prepolymer (from DMPA) was neutralized by adding TEA. Chain extension by adding EDA (mixed with MEK) was performed before dispersal. Finally, distilled water was added to complete the dispersion.

Synthesis of WBPU-Xn Dispersion

At first, $H_{12}MDI$ (50%) was mixed mechanically with Xn in the presence of DBTDL. The mixture was further mixed with the prepolymer, which was prepared by mixing $H_{12}MDI$ (50%), DMPA, and PTMG. The other steps were similar to those of the WBPU dispersion preparation.

Synthesis of WBPU-XnAc Dispersion

Exactly the same method was followed as used in the WBPU-Xn preparation except XnAc was used instead of Xn.

Synthesis of WBPU-B, WBPU-Xn-B and WBPU-XnAc-B Dispersion

A proper amount (0.50 wt %) of zinc pyrithione was directly mixed to the dispersion under gentle stirring (200 rpm) for 1 h at room temperature.

Coating onto a PVC Sheet

An autocoater was used to coat PVC with a 100-μm-thick layer. The coated PVC sheet was kept at room temperature to evaporate the water from the coating. To remove any trace solvent from the coating, the dried coatings were further dried at 70° C. for 24 h.

Example 2

Characterization

To identify the polymer and coating functionality, FTIR spectroscopy (Impact 400D, Nicolet, Madison, Wis.) was used.

$^1$H-NMR spectra of the coatings were recorded with a Fourier transform Bruker 300 MHz spectrometer (model AC-300). Ten milligrams of coating was dissolved in 6 mL of deuterated chloroform. The internal reference was THF.

The dispersion mean particle size was measured using laser-scattering equipment (Autosizer, Melvern IIC, Malvern, Worcester, UK). The experiment was performed at room temperature.

A Malvern Zetasizer 3000 zeta-potential analyzer was used to record the zeta potential value of the dispersion.

All the swelling test coatings were immersed in water at 30° C. for 48 h. The swelling (%) was determined from the following equation:

$$\text{Weight Loss }(\%)=(W_i-W_f/W_i)\times 100 \quad (1)$$

where $W_i$ is the weight of the initial dried film and $W_f$ is the weight of the final degraded film.

Self-polishing was performed under dynamic conditions in artificial salt water (3%) based on a previous report. This was determined from the reduction in the film thickness. The specimens were attached to the outer vertical surface of a rotor to confirm the film conditions. Each experiment was repeated three times, and the average value was counted.

The molecular weight of polymer was analyzed by gel permeation chromatograph (GPC, Analytical Scientific Instruments, Model 500, USA). Tetrahydrofuran (THF) was the carrier solvent at a flow rate of 1 mL/min.

ASTM D3623 specification was followed for the antifouling test. This test was performed for 8 months in Jubail, Saudi Arabia. The coatings were immersed in sea water for a defined interval. Periodically, the samples were removed and photographed.

Example 3

Results and Discussion

Figure 1B:
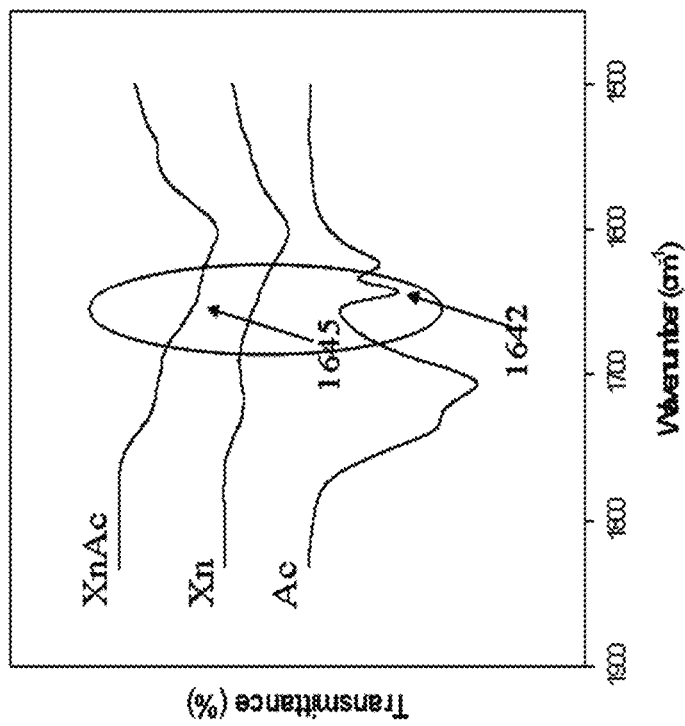
FIG. 1B shows a zoomed-in view of the FT-IR spectra of FIG. 1A.

Xn and XnAc were used to synthesize the WBPU-Xn and WBPU-XnAc coatings, respectively. XnAc was synthesized by functionalization of Xn using AA. The synthesized XnAc was identified by FT-IR and $^1$H-NMR spectroscopy techniques (see FIGS. 1A, 1B, and 2). The FT-IR spectrum of Xn (FIGS. 1A and 1B) shows absorption peaks at 3277 cm$^{-1}$ due to (O—H) axial deformation and 2850-2950 cm$^{-1}$ due to the symmetric and asymmetric stretching vibrations of the (C—H) group in the methyl and methylene groups. The bands at 1710 cm$^{-1}$ are due to the C=O stretching vibration, while the bands near 1601 cm$^{-1}$ are due to the axial deformation of (C—O) enols. The FT-IR spectrum of XnAc (FIGS. 1A and 1B) shows all identical peaks for Xn. Additionally, a new peak appeared at 1645 cm$^{-1}$ (see FIG. 1B) and was assigned to C=C from AA. This result confirmed the successful modification of Xn by AA to synthesize XnAc.

Figure 2:
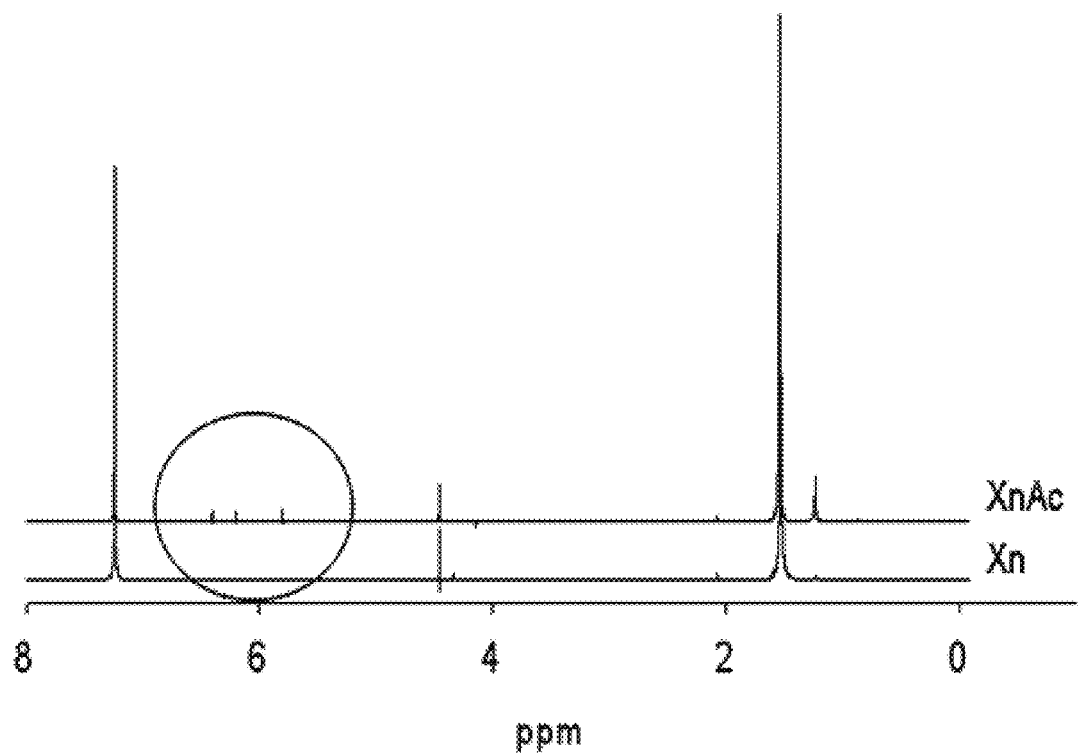
FIG. 2 shows $^1$H-NMR spectra of Xn and XnAc polymers.

The $^1$H-NMR spectrum of Xn displays chemical shifts at δ (ppm)=1.33 (s, 3H, terminal (—CH$_3$) group of pyruvate) and 1.53 (s, 3H, terminal —CH$_3$ group of acetyl group in α-D-mannose); the chemical shift at δ (ppm)=2.10 corresponds to the (—OH & —CH$_2$) groups of the anhydroglucose units of Xn (see FIG. 2). The $^1$H-NMR spectrum of XnAc displays similar values as Xn. Additionally, a few new peaks appeared at 5.80, 6.20, and 6.41 ppm (see FIG. 2). These new peaks appeared due to the new bonds with AA. Both FT-IR and NMR analyses confirmed the new modified xanthan polymer, XnAc.

Figure 3:
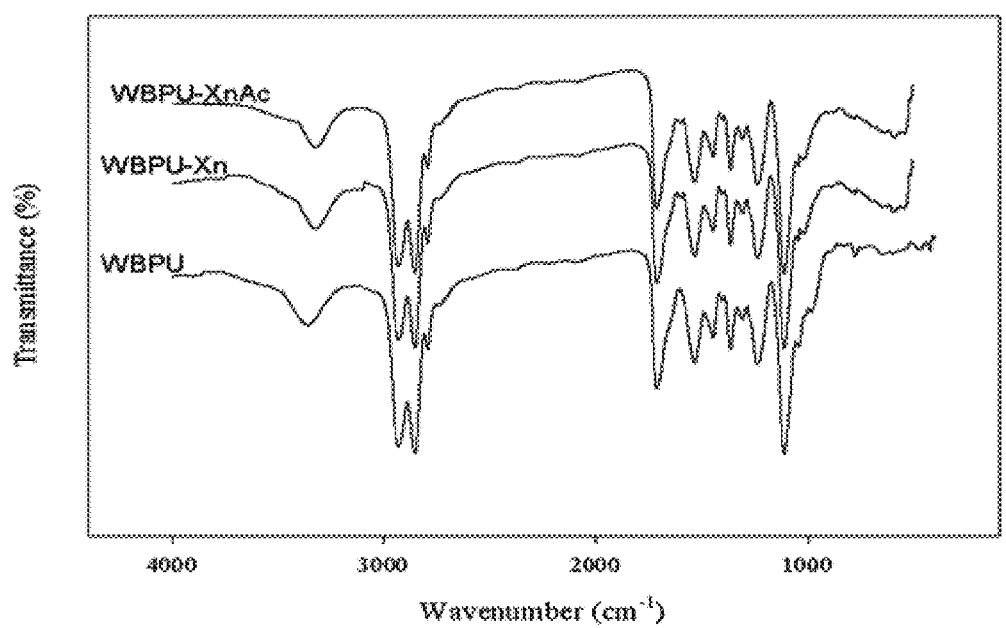
FIG. 3 shows FT-IR spectra of WBPU, WBPU-Xn, and WBPU-XnAc coatings.

The WBPU, WBPU-Xn, and WBPU-XnAc dispersion compositions are summarized in Table 1. FT-IR spectra (see FIG. 3) were used to confirm the completion of the reaction. In all cases, the isocyanate group completely reacted with EDA before the dispersion step. It is observed that there is no noticeable difference between the FTIR spectra of WBPU, WBPU-Xn, and WBPU-XnAc. In all cases, the bands at 3150-3600 cm$^{-1}$, 2800-3000 cm$^{-1}$, 2795 cm$^{-1}$, and 1109 cm$^{-1}$, which correspond to NH, CH, O—CH$_2$, and C—O—C stretching and the ether group, respectively, were observed. Additionally, the bands at 1600-1760 cm$^{-1}$ and 1540 cm$^{-1}$ can be attributed to amide I and amide II of the C=O group, respectively. A very weak single band is observed at 833 cm$^{-1}$ and can be attributed to either the coupled vibrations of the C—O stretching or CH$_2$ rocking modes. A strong band assigned to the asymmetric stretching vibration of the C—N group is expected at 1040 cm$^{-1}$; however, this band overlaps with the very strong band at 1109 cm$^{-1}$, which corresponds to the C—O—C stretching vibration of the ether groups in the PU films. In the WBPU-XnAc dispersion, an additional band appeared at 1645 cm$^{-1}$ and can be assigned to C=C, which comes from AA.

Figure 4:
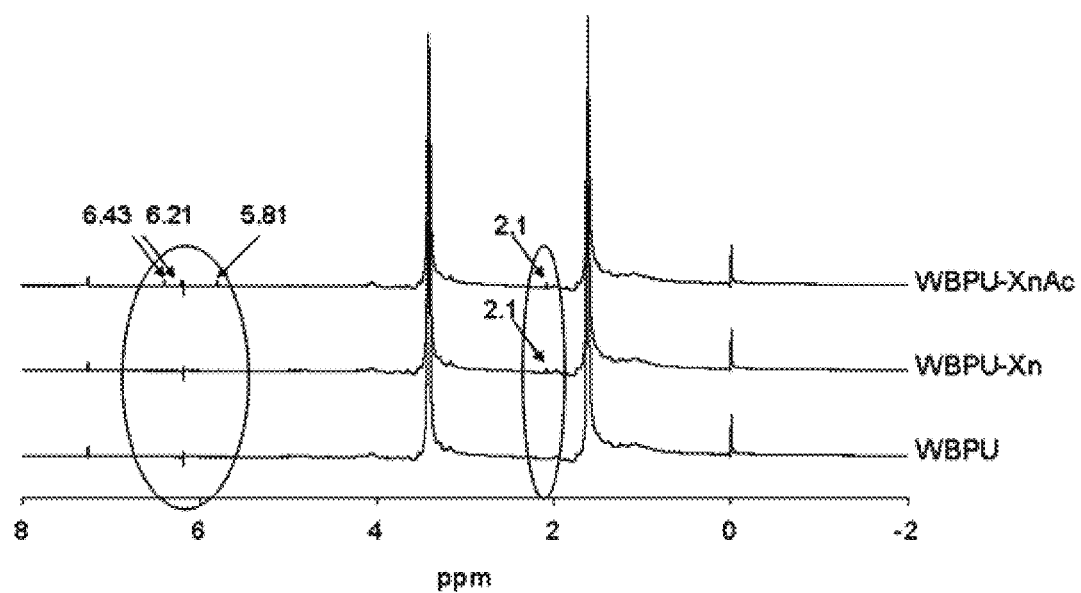
FIG. 4 shows $^1$H-NMR spectra of typical coatings.

$^1$H-NMR spectroscopy was also applied to confirm the presence of Xn and XnAc in WBPU coatings (see FIG. 4). All the identical peaks for WBPU as well as Xn and XnAc were recorded. In both WBPU-Xn and WBPU-XnAc coatings the peak at 2.10 ppm corresponds to the (—OH & —CH$_2$) groups of the anhydro-glucose units of Xn. Other identical peaks merged with PU peaks. In WBPU-XnAc coatings additional peaks appeared at 5.81, 6.21, and 6.43 ppm. Thus, FT-IR and $^1$H-NMR results confirmed the successful synthesis of WBPU-Xn and WBPU-XnAc coatings.

TABLE 2

WBPU dispersion properties

| Sample | Particle size (nm) | pH | Zeta potential (−mV) |
|---|---|---|---|
| WBPU | 42 | 7.1 | 53 |
| WBPU-Xn-25 | 44 | 7.0 | 53 |
| WBPU-XnAc-25 | 44 | 7.1 | 54 |
| WBPU-Xn-50 | 47 | 6.9 | 54 |
| WBPU-XnAc-50 | 48 | 6.9 | 52 |
| WBPU-Xn-75 | 51 | 6.8 | 55 |
| WBPU-XnAc-75 | 52 | 6.8 | 51 |
| WBPU-Xn-1 | 60 | 6.7 | 56 |
| WBPU-XnAc-1 | 61 | 6.7 | 49 |

All dispersions were free from any precipitation or coagulation. The dispersion properties are summarized in Table 2. A larger mean particle size was recorded for WBPU-Xn and WBPU-XnAc dispersions than the WBPU dispersion. As Xn or XnAc was added directly to the polymer chain, the particle size increased slightly in both WBPU-Xn and WBPU-XnAc dispersions. With increasing Xn or XnAc content, the mean particle size also continued to increase. However, for all of the dispersions, the mean particle size was not larger than 61 nm, which is a favorable size for use as a coating material. The pH of the dispersions was slightly reduced using Xn or XnAc in the dispersion. This might be due to the presence of the pyruvic acid cycles of Xn or XnAc. Based on the zeta potential values, the stability of the dispersions was analyzed. The zeta potential value slightly decreased in the WBPU-Xn dispersion, whereas the value slightly increased in the WBPU-XnAc dispersion compared to the WBPU dispersion. In the WBPU-Xn dispersions, the presence of polar groups such as OH and COOH may decrease the zeta potential value. As the number of OH polar groups was reduced in WBPU-XnAc dispersions, the zeta potential value increased slightly. However, all of the dispersion zeta potential values were approximately −50 mV, confirming stable dispersions of WBPU-Xn and WBPU-XnAc.

Hydrophilicity is an important parameter of coatings. Water swelling (%) and water contact angle methods were used to determine the hydrophilicity or wet resistance of the coatings. The degree of swelling/value of the contact angle indicates the material affinity for water, which ultimately represents the degradation rate of polymeric materials under the influence of environmental factors, especially under wet

TABLE 1

Sample designation and composition of coatings.

Figure 5:
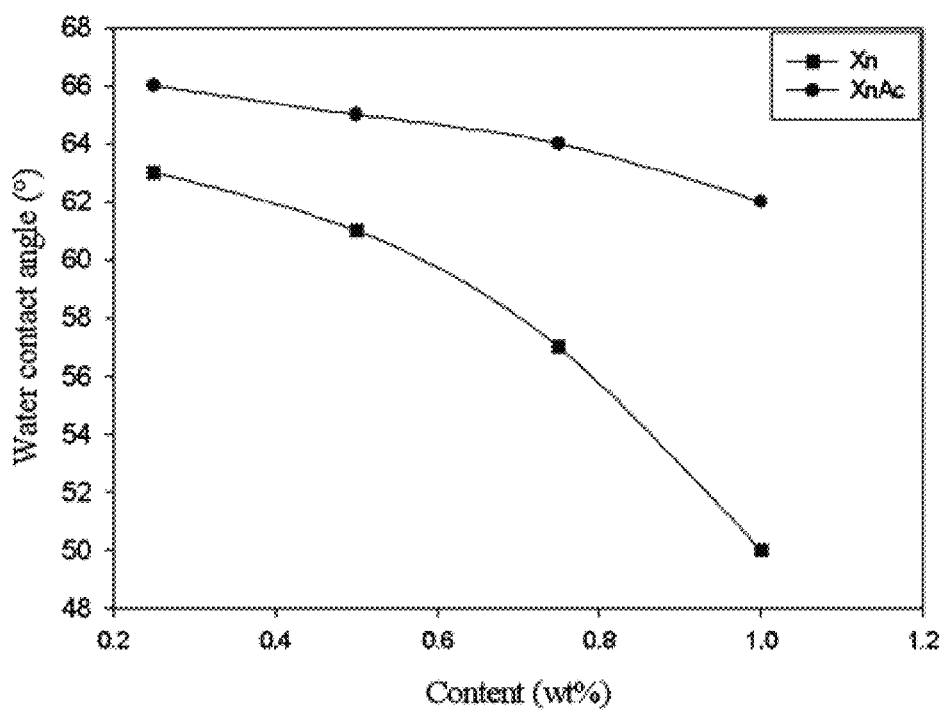
FIG. 5 is a graph of the water contact angle of coatings with different contents of Xn and XnAc.

| Sample Designation | Composition (Mole) | | | | | Xn (wt %) | XnAc (wt %) | Zinc pyrithione (wt %) |
|---|---|---|---|---|---|---|---|---|
| | Polyol | DMPA | H$_{12}$MDI | TEA | EDA | | | |
| WBPU | 0.04 | 0.054 | 0.113 | 0.054 | 0.019 | ... | ... | ... |
| WBPU-B | 0.04 | 0.054 | 0.113 | 0.054 | 0.019 | ... | ... | 0.50 |
| WBPU-Xn-25 | 0.04 | 0.054 | 0.113 | 0.054 | 0.019 | 0.25 | ... | ... |
| WBPU-XnAc-25 | 0.04 | 0.054 | 0.113 | 0.054 | 0.019 | ... | 0.25 | ... |
| WBPU-Xn-50 | 0.04 | 0.054 | 0.113 | 0.054 | 0.019 | 0.50 | ... | ... |
| WBPU-XnAc-50 | 0.04 | 0.054 | 0.113 | 0.054 | 0.019 | ... | 0.50 | ... |
| WBPU-Xn-75 | 0.04 | 0.054 | 0.113 | 0.054 | 0.019 | 0.75 | ... | ... |
| WBPU-XnAc-75 | 0.04 | 0.054 | 0.113 | 0.054 | 0.019 | ... | 0.75 | ... |
| WBPU-Xn-1 | 0.04 | 0.054 | 0.113 | 0.054 | 0.019 | 1.00 | ... | ... |
| WBPU-Xn-1-B | 0.04 | 0.054 | 0.113 | 0.054 | 0.019 | 1.00 | ... | 0.50 |
| WBPU-XnAc-1 | 0.04 | 0.054 | 0.113 | 0.054 | 0.019 | ... | 1.00 | ... |
| WBPU-XnAc-1-B | 0.04 | 0.054 | 0.113 | 0.054 | 0.019 | ... | 1.00 | 0.50 | conditions. The water swelling (%) and water contact angle values are summarized in Table 3. The typical values are also shown in FIG. 5. It is clear that all coatings tend to swell after being dipped in water. All the coatings are quite hydrophilic. Both WBPU-Xn and WBPU-XnAc coatings are more hydrophilic than the WBPU coating. However, the water swelling rate and water contact angle values of the coatings differ for the WBPU-Xn and WBPU-XnAc coatings. The hydrophilicity was higher for the WBPU-Xn coatings, and the hydrophilicity continued to increase with increasing Xn content. The WBPU-Xn coating had high water swelling and low water contact angle values when the Xn content was approximately 1.0 wt %. This result indicates the very poor water resistivity of coating when WBPU-Xn has a higher Xn content. Such behavior might be due to the presence of free polar groups (carboxyl and OH groups), which ultimately determine the hydrophilic properties of the polymer. Most importantly, the hydrophilicity comparatively decreased in the WBPU-XnAc coatings. In WBPU-XnAc, XnAc has fewer hydroxyl groups, resulting in a decrease in the polar groups and contributing to the increase in the hydrophilicity degree.

Different adhesive strengths were recorded after immersion of the coatings for 24 h (see also Table 3). Although no mechanical damage was observed, the adhesive strength changed dramatically. A large decrease in the adhesive strength was recorded for the WBPU-Xn coatings. A comparatively slight decrease in adhesive strength was recorded for the WBPU and WBPU-XnAc coatings. The presence of a polar group in the PU structure resulted in the difference in adhesive strength. More polar groups made the coating hydrophilic, which ultimately decreased or damaged the mechanical interlocking between the coatings and PVC; as a result, the maximum adhesive strength decreased in the immersed WBPU-Xn coatings.

TABLE 4

Properties of immersed coatings at defined interval (day)

| | Weight loss (%) | | | | Thickness (μm) | | | |
|---|---|---|---|---|---|---|---|---|
| Coating | 1 day | 30 day | 60 day | 90 day | 1 day | 30 day | 60 day | 90 day |
| WBPU | 0 | 0.1 | 0.3 | 0.8 | 60 | 59.8 | 59.5 | 58.5 |
| WBPU-Xn-25 | 0 | 0.5 | 0.9 | 1.5 | 60 | 59.2 | 58.4 | 56.9 |
| WBPU-XnAc-25 | 0 | 0.3 | 0.5 | 1.1 | 60 | 59.6 | 58.8 | 58.2 |
| WBPU-Xn-50 | 0 | 0.8 | 1.5 | 2.1 | 60 | 58.4 | 56.6 | 53.3 |
| WBPU-XnAc-50 | 0 | 0.5 | 0.8 | 1.4 | 60 | 59.4 | 57.9 | 56.5 |
| WBPU-Xn-75 | 0 | 1.7 | 3.5 | 8.0 | 60 | 56.7 | 51.1 | 47.6 |
| WBPU-XnAc-75 | 0 | 0.7 | 1.2 | 1.9 | 60 | 59.1 | 57.2 | 55.0 |
| WBPU-Xn-1 | 0 | 3.0 | 6.8 | 14.5 | 60 | 55.5 | 50.0 | 40.2 |
| WBPU-XnAc-1 | 0 | 1.0 | 1.7 | 2.5 | 60 | 58.7 | 57.0 | 54.5 |

TABLE 3

WBPU coating properties

| Sample | Water swelling (%) | Water Contact Angle (°) | Adhesive strength (Kgf/cm) Before immersion | Adhesive strength (Kgf/cm) After immersion |
|---|---|---|---|---|
| WBPU | 8 | 67 | 3.0 | 2.7 |
| WBPU-Xn-25 | 9 | 63 | 3.8 | 2.4 |
| WBPU-XnAc-25 | 8.5 | 66 | 3.7 | 3.4 |
| WBPU-Xn-50 | 10 | 61 | 4.0 | 2.2 |
| WBPU-XnAc-50 | 9 | 65 | 3.9 | 3.5 |
| WBPU-Xn-75 | 13 | 57 | 4.2 | 2.0 |
| WBPU-XnAc-75 | 10 | 64 | 4.0 | 3.2 |
| WBPU-Xn-1 | 19 | 50 | 4.3 | 1.3 |
| WBPU-XnAc-1 | 11 | 62 | 4.1 | 2.9 |

Figure 6:
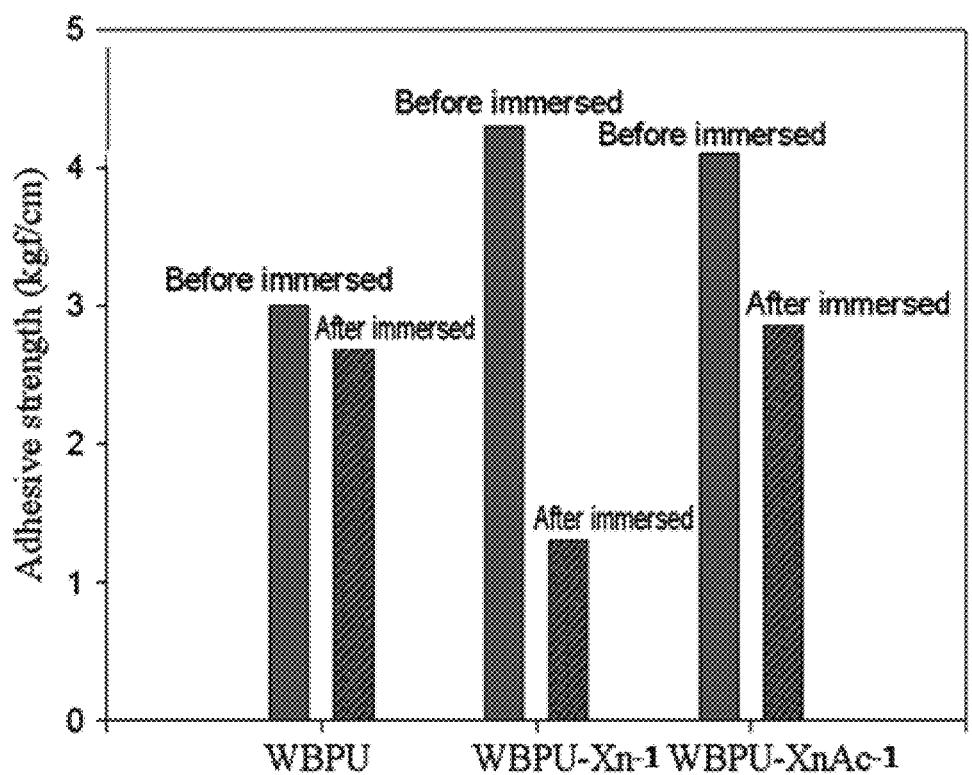
FIG. 6 is a graph of the adhesive strengths of typical coatings at different conditions.

FIG. 6 shows the typical coating adhesive strength on PVC, which was considered as a base specimen in this study. Higher adhesive strength was recorded for both WBPU-Xn and WBPU-XnAc coatings compared to the WBPU coatings. The maximum adhesive strength was recorded for the WBPU-Xn coatings due to the presence of a larger quantity of polar groups, which may introduce more hydrogen bonds to increase the adhesive strength.

Although coating erosion is important for SPC coatings, the overall performance of an SPC coating depends on the erosion rate of the coating. Very rapid erosion may also have a negative impact on long-term performance. The erosion was evaluated by a weight loss test and the change in molecular weight. The higher weight loss implies a higher erosion rate. The weight loss was calculated after immersing the coating for 1, 30, 60, and 90 days. As summarized in Table 4, all WBPU-XnAc films had a slower initial erosion rate than the WBPU-Xn films. There might be two factors for less hydrolyzed erosion with the WBPU-XnAc films. First, a WBPU-XnAc content resulted in fewer hydroxyl groups due to the substitution of the OH group in XnAc. Upon scission of the polyol units, it is expected that the polyol chains will be lost. The mass loss of WBPU-Xn (0% XnAc) was considerably larger than that of the WBPU-XnAc films. It was found that the WBPU-Xn-1 coating eroded by almost 14.5% over 90 days, while the WBPU-XnAc-1 films with the maximum XnAc content eroded by only 2.5%. Another reason is the hydrophobic nature of XnAc. Usually, in water-swollen polymer networks, there is a great number of Xn since XnAc is quite hydrophobic. It is believable that the presence of the XnAc moieties enhances the hydrophobicity around the bound polyol and hinders water penetrating the film. This inference is in good agreement with the swelling behavior and contact angle of WBPU-XnAc, as the swelling ratio is lower for films with higher XnAc content and the contact angle is higher with higher XnAc content. Therefore, the erosion rate can be affected by the XnAc content; eventually, a higher XnAc content corresponds to a slower coating erosion rate. The slowest erosion rate was recorded for the WBPU coating. The rate slowed down after 2 months. Comparing the erosion results, the WBPU-XnAc coating showed a steady rate, which is a prediction of long-term protection against fouling.

Although coating erosion is important for SPC coatings, the overall performance of an SPC coating depends on the erosion rate of the coating. Very rapid erosion may also have a negative impact on long-term performance. The erosion was evaluated by a weight loss test and the molecular weight. The higher weight loss implies a higher erosion rate. The weight loss was calculated after immersing the coating for 1, 30, 60, and 90 days. As summarized in Table 4, all WBPU-XnAc films had a slower initial erosion rate than the WBPU-Xn films. There might be two factors for less hydrolyzed erosion with the WBPU-XnAc films. First, a WBPU-XnAc content resulted in fewer hydroxyl groups due to the substitution of the OH group in XnAc. Upon scission of the polyol units, it is expected that the polyol chains will be lost. The mass loss of WBPU-Xn (0% XnAc) was considerably larger than that of the WBPU-XnAc films. It was found that the WBPU-Xn-1 coating eroded by almost 14.5% over 90 days, while the WBPU-XnAc-1 films with the maximum XnAc content eroded by only 2.5%. Another reason is the hydrophobic nature of XnAc. Usually, in water-swollen polymer networks, there is a great number of Xn since XnAc is quite hydrophobic. It is believable that the presence of the XnAc moieties enhances the hydrophobicity around the bound polyol and hinders water penetrating the film. This inference is in good agreement with the swelling behavior and contact angle of WBPU-XnAc, as the swelling ratio is lower for films with higher XnAc content and the contact angle is higher with higher XnAc content. Therefore, the erosion rate can be affected by the XnAc content; eventually, a higher XnAc content corresponds to a slower coating erosion rate. The slowest erosion rate was recorded for the WBPU coating. The rate slowed down after 2 months. Comparing the erosion results, the WBPU-XnAc coating showed a steady rate, which is a prediction of long-term protection against fouling.

Figure 7:
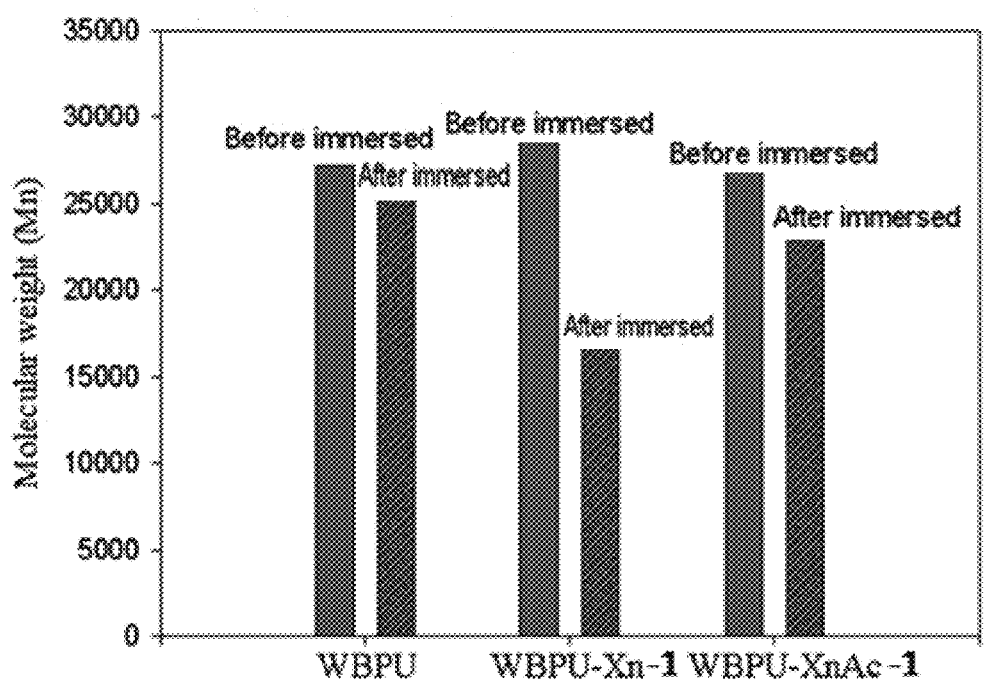
FIG. 7 is a graph of the molecular weights of typical coatings at different conditions.

The effect of erosion on the self-polishing nature of the coating was also evaluated by measuring the thickness of the exposed coatings. The change in the thickness of the coatings under dynamic immersion testing is summarized in Table 4. The coatings exhibited a gradual decrease in thickness with time in both WBPU-Xn and WBPU-XnAc coatings. However, the thickness decreased faster for WBPU-Xn than for WBPU-XnAc. This difference implies that the WBPU-Xn coating might not last for a long time under immersion conditions. The WBPU coating exhibited the smallest change in thickness, possibly due to the slowest rate of erosion. Three selected immersed coatings (WBPU, WBPU-X-1, WBPU-XnAc-1) for 3 month were also analyzed by GPC to check their molecular weight (see FIG. 7). All three coatings showed lower molecular weights after immersion in water. This change implies that the coatings were eroded. However, a substantially lower molecular weight was found for the WBPU-Xn coating, and a moderately lower molecular weight was found for the WBPU-XnAc coating. The highest molecular weight was found for the WBPU coating. This analysis confirmed that the WBPU-Xn coating eroded very quickly, which also matched the weight loss test results. At the same time, the WBPU-XnAc coating moderately eroded. The WBPU coating eroded very slowly.

The antifouling test was performed under real conditions. All selected coatings were immersed in a marine environment. The coatings antifouling properties were examined by visual inspection. The fouling compounds started to attach to the WBPU, WBPU-Xn or WBPU-XnAc coating within a few days (not shown). Comparatively, the fouling attachment on the WBPU-Xn coating was slower than that on the WBPU and WBPU-XnAc coatings.

Figure 8:
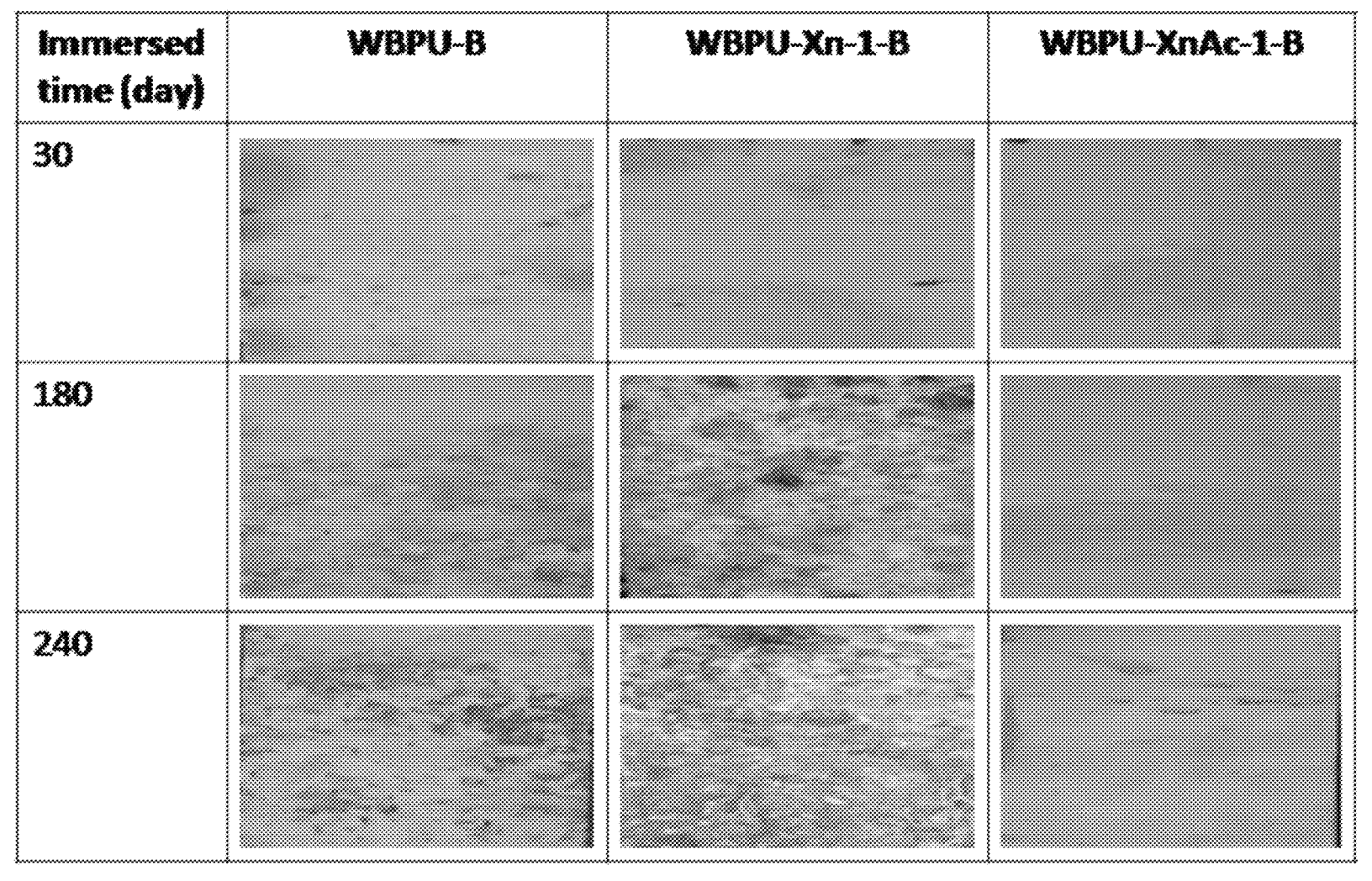

However, all coatings were fully covered by fouling in the next 30 days. No significant protection was observed for either the WBPU-Xn or WBPU-XnAc coatings. This confirmed that Xn or XnAc has no direct effect on antifouling properties. A different scenario was observed using biocide in three selected coatings (namely, WBPU-B, WBPU-Xn-1-B and WBPU-XnAc-1-B). Pictures corresponding to 30, 180 and 240 days of immersion of those coatings are presented in FIG. 8. In the early stage, all coatings showed almost similar protection properties; all the coatings were free from fouling attachment. With time, the protection efficiency of the WBPU-B, WBPU-Xn-1-B and WBPU-XnAc-1-B coatings changed. After 180 days, the WBPU-B coating slightly fouled and WBPU-XnAc-1-B coating was still free from foulants, whereas the coating WBPU-Xn-1-B was moderately covered with foulants. After 240 days, the WBPU-XnAc-1-B coating was still free from fouling. The specimen with the WBPU-Xn-1-B coating was fully covered with fouling, whereas the WBPU-B coating was moderately covered with fouling. Although the same biocide and similar content were used in all three coatings, the protection ability was different. This can be ascribed to the erosion rate of the coating. The WBPU-Xn-1-B coating had the maximum rate of erosion (confirmed before). As a result, the specimen may have had a very thick coating layer (by 180 days), which may have not had biocide storage at that time. Ultimately, the foulants can easily attach to the WBPU-Xn-1-B coating. In the WBPU-B coating, the very slow erosion rate was insufficient to release the biocide and foulants attached after a short period. Only the WBPU-XnAc-1-B coating contained the proper combination of monomers and XnAc content, which resulted in the proper coating erosion rate and made the coating leachable for a longer time. Ultimately, the antifouling property improved for a longer version.

Antifouling coatings were prepared with different Xn and XnAc contents in defined monomer compositions of WBPU. The hydrophilicity and adhesive strength (before immersion) of the coatings increased with increasing Xn or XnAc content, with the maximum increase occurring with the maximum amount of Xn or XnAc content. All coatings without biocide were covered with foulants. A better antifouling property was observed only with the WBPU-XnAc-1-B coating. The XnAc in the WBPU coating allowed a correct rate of biocide leaching due to an appropriate erosion rate of the coating. Such an XnAc-based SPC coating may be a good choice in offshore fixed structures.

The invention claimed is:

1. A method of inhibiting marine fouling of a surface, the method comprising:
   contacting the surface with a composition to produce a coated surface, the composition comprising:
   a waterborne polyurethane (WBPU) crosslinked with an acrylic acid functionalized polysaccharide;
   water; and
   a preservative dispersed in the crosslinked WBPU, and
   drying the coated surface to produce a treated surface having a deposited film.

2. The method of claim 1, wherein the acrylic acid functionalized polysaccharide is present in the deposited film at a weight percentage of 0.1-5.0 wt % relative to a total weight of the deposited film.

3. The method of claim 1, wherein the polysaccharide is at least one selected from the group consisting of xanthan, beta-glucan, dextran, inulin, galactan, glycogen, hemicellulose, levan, lignin, mannan, pectin, amylopectin, and amylose.

4. The method of claim 1, wherein the acrylic acid functionalized polysaccharide comprises 1-50 wt % acrylic acid functional groups relative to a total weight of the acrylic acid functionalized polysaccharide.

5. The method of claim 1, wherein the polysaccharide is xanthan.

6. The method of claim 1, wherein the composition comprises 50-90 wt % water relative to a total weight of the composition.

7. The method of claim 1, wherein the preservative is present at a weight percentage of 0.01-2.0 wt % relative to a total weight of the composition.

8. The method of claim 1, wherein the composition further comprises a pigment.

9. The method of claim 1, wherein the composition consists of the crosslinked WBPU, the preservative, and water.

10. The method of claim 1, wherein the contacting is done by electrocoating, spraying, electrostatic spraying, dipping, rolling, brushing, dropping, spin coating.

11. The method of claim 1, wherein the preservative is zinc pyrithione.

12. The method of claim 1, wherein the deposited film has a density in a range of 0.8-2.0 g/cm$^3$.

13. The method of claim 1, wherein the crosslinked WBPU has a number average molecular weight in a range of 26-32 kDa.

14. The method of claim 13, wherein the number average molecular weight decreases to 22-24 kDa following at least 24 h of immersion in water, seawater, or brine.

15. The method of claim 1, wherein the deposited film has a water contact angle in a range of 45°-67°.

16. The method of claim 1, wherein the deposited film, when immersed in water, seawater, or brine for at least 24 hours, absorbs no more than 15 wt % water in relation to a weight of the deposited film.

17. The method of claim 1, wherein the deposited film is in the form of a layer in direct contact with the surface, the deposited film having an average thickness in a range of 1-200 μm.

18. The method of claim 1, wherein the deposited film, when placed in contact with water, seawater, or brine for 90 days, has a dry weight loss in a range of 1.5-8.0 wt % relative to an initial dry weight.

* * * * *